3,096,622
SOIL SETTLING METHOD
Richard E. Landau, 61—59 Dry Harbor Road,
Middle Village, Long Island, N.Y.
No Drawing. Filed July 2, 1958, Ser. No. 746,099
4 Claims. (Cl. 61—10)

This invention relates to a method of draining water or other liquids from a soil or earth formation. More particularly, this invention relates to a novel method of consolidating an earth formation containing substantial quantities of water or other liquids.

Soil deposits generally contain a substantial quantity of water dispersed within their structural matrix. Such water is most generally associated with the level of water in the soil, which is more commonly termed the "water table." The nature of compressible soils is such that when heavy construction such as multi-story buildings, bridges, roadway embankments and the like are erected, so as to be supported directly or indirectly by the soil, the soil will settle or consolidate and be otherwise distorted or displaced, resulting in damage to the construction.

When a soil mass is subjected to a load, such as compressive stress effected by construction, a reduction in the soil volume occurs. Inasmuch as the soil grains are relatively incompressible, the reduction in soil volume is essentially a reduction in the volume of the pore spaces between the soil grains. Inasmuch as these pore spaces are generally filled with water which is in itself relatively incompressible, it is necessary that the water be squeezed out of the pore spaces in order for settlement to occur. Thus, the rate at which settlement or consolidation will occur is related to the ability of the soil matrix to permit the passage of pore water. The more fine-grained the soil, the slower will be the pore water be released or in other words, the lower the "permeability" of the soil.

Initially, before the reduction of pore space takes place, the new compressive stresses are carried by the water in the formation. The pore water pressure increases beyond its normal hydrostatic pressure (pressure associated with water depth) by an increment called "hydrostatic excess pressure" or "excess pore pressure." When consolidation is completed the excess pore pressure reduces to zero. Prior to complete consolidation there is a gradual transfer of pressure from the pore water to the soil matrix. The soil matrix pressure, called "intergranular pressure," then builds up to a point where it is supporting the entire compressive load, at which point consolidation is complete. Theoretically, consolidation at a given load takes an infinite time; however, from a practical point of view, where special design features are not provided to obtain full consolidation, the 90% point is sometimes used as a practical limit.

Since the rate of consolidation is related to soil permeability, and soil permeability generally decreases as the soils become finer grained, it follows that fine-grained soils take longer to consolidate than coarser grained soils. It is also known that the thicker the deposit the longer the time necessary for consolidation. Whereas it may take only months to consolidate loose sands, it may take hundreds of years to consolidate thick clay deposits to a reasonable degree to support construction, unless the consolidation is accelerated.

It is critical that the major portion of consolidation, if not the entire consolidation, be made to occur as early as possible in the construction work in order to keep maintenace cost of the construction to a minimum. When settlement can be accomplished prior to the completion of construction, any distortion in the construction due to such settlement can be corrected prior to the use of the completed project. As such, there will be little, if any, maintenance cost due to foundation distortion. However, if settlement and soil distortion were to continue after the completion of construction, maintenance expenditures will be necessary for as long a period as is necessary for the settlements and soil movements to reduce to a negligible quantity. To eliminate foundation maintenance, it is necessary to effect rapid soil consolidation where construction loads are supported directly on the soil; and, where lowering of the excess hydrostatic pressure will effect settlement of construction, a means for effecting a rapid reduction in such pressure is needed.

Most highly compressible soils are alluvial deposits, which were laid down in horizontal layers in the geologic past. Such deposits, generally, have a higher permeability in a horizontal direction along the bedding plane than in the vertical direction across the bedding planes. This condition is particularly pronounced in varved deposits which consist of alternating layers of fine and coarse grained materials. Varved deposits were generally formed by the stagnation of the continental glaciers, and are often found in rivers and lakes. When such soils are loaded, the resulting pore water pressure tends to dissipate by the migration of water to a low pressure zone. If the area of load aplication is large as compared to the thickness of the compressible stratum, the low pressure zone that controls the water flow is usually the ground surface where atmospheric pressure exists, or a highly permeable lower granular stratum. In these cases the water must flow vertically, which is the least efficient direction, as previously discussed. In order to take advantage of the higher horizontal permeability, the construction industry has resorted to the use of drains. These drains, which are generally installed vertically but may, in various cases, be installed at an angle, or even horizontally, are voids in the earth that serve as low pressure points to which the pore water may flow when under pressure, and through which the pore water may leave the soil formation. In order to support the walls of the void, the hole is generally back-filled with a material of relatively high permeability, such as coarse sand; other materials and other means are sometimes used to maintain the void. The pore water flowing into the void, and thereby leaving the soil formation, results in a more rapid consolidation of the subsoil than is usually possible by relying entirely upon the dissipation of water in the vertical direction without using drains. Such voids have been generally termed "sand drains," as sand is used most often as a backfill material. The flow of pore water into the sand drain may be hastened by increasing the pore water pressure by external loading or other suitable means, or by decreasing the pressure within the sand drain, such as by pumping water out of the sand drain or reducing the elevation of the sand drain outfall so that water would be flowing against a lower pressure head; these actions occurring such that the sand drains are not adversely affected. The usual means of effecting the rate of pore water flow is the weight of the construction applied to the area where the sand drains are installed. If deemed necessary, the weight of the construction may be increased during the construction period to expedite the flow of pore water. Oftentimes an equivalent weight of earth is used in place of the weight of the contemplated construction to cause the desired water flow into properly situated sand drain or drains. After the desired settlement has occurred, the earth is removed and the structure built without any further danger of excessive settlement occurring. In this way maintenance costs are reduced, if not entirely eliminated, and the safety and continuous utility of the construction is assured with respect to damage by settlement and soil movement.

Heretofore, it has been the practice to construct sand drain holes by ramming or driving a hollow casing into the formation, and filling the casing with porous material which, in turn, fills the void formed by the displaced soil. See, for example, United States Patent No. 2,659,208. Because of the nature of the soils involved in this type of treatment, ramming substantially decreases the horizontal permeability of the soil and results in a slower consolidation rate than would otherwise be possible. This decrease in permeability is due to the smearing of the face of the void contiguous to the casing, as well as due to the remolding of the soil in the vicinity of the hole by displacement due to the driving of the casing.

The remolding of the soil also has the effect of reducing the strength of the soil to a point where the soil may not be able to sustain the weight of the construction without failing by displacement as opposed to movement due to settlement. In addition, because the soil is remolded, the magnitude of total settlement is often increased as compared to soil which is not remolded. Because of these disadvantages, the use of sand drains has received somewhat limited acceptance and, in many cases, such installations have led to failure of construction.

An object of this invention is to provide a method for constructing a drainage area in an earth formation, which method substantially avoids displacing, remolding and smearing of the subsoil.

Other objects of this invention will appear to those skilled in the art as the description of this invention unfolds.

I have discovered a method for constructing drain holes in an earth formation which avoids the disadvantages of the prior art. Generally stated, my invention comprises cutting into the earth formation to the desired depth, removing the section of soil traversed by cutting and filling the cavity created thereby with a porous medium, thus providing a low pressure zone for the formation water to enter.

By cutting into the earth, rather than ramming or pounding, the earth forming the walls of the cavity is not smeared, remolded, or in any way decreased in strength, and the soil retains substantially the degree of permeability present before cutting.

Inasmuch as consolidation is generally accompanied by an increase in shear strength, sand drains are oftentimes used to effect a rapid increase in the soil shear strength, so that the soil may support heavier loads than would otherwise have been possible. However, any initial remolding of subsoil during the installation of the sand drain would generally result in a reduction of the initial shear strength of the subsoil, thereby defeating the purpose of the sand drain installation.

While it is not critical that the cutting unit employed be constructed so that withdrawing it from the earth also removes the section of earth cut thereby, it is convenient and preferable to use such a unit. For example, an auger-type drill having continual flights has proven satisfactory; the flights on the auger defining the circumference of the cavity.

Additionally, it is most desirable that the cutting unit have a hollow shaft through which may be passed sand or other porous material. In this way, the porous material may be passed through the shaft while, at the same time withdrawing the cutting unit, thereby providing continuous support for the walls of the cavity. It is noted that various field test devices such as piezometers may be installed through the hollow shaft prior to backfilling.

If a hollow shaft cutting unit is employed, the bottom of the shaft may be equipped with a plug or plate so as to prevent the soil penetrated by the cutting unit from travelling up the hollow shaft. Such plug or plate, however, should be such that it is readily removed or perforated to allow admission of the porous material into the cavity.

In clay or clay-like deposits, there are frequently alternate zones of permeable and impermeable strata, called "varves." When this is the case, the formation water often finds its way to the sand drain through the permeable varves which are often sandy or silty. The less permeable varves usually consist of clay or clay-like material, through which the water or other formation liquid cannot easily penetrate. If the earth is removed by pulling the cutting unit, there is likelihood that smearing of the permeable strata with the less permeable material will occur. It is therefore desirable to effect at least one complete revolution of the cutting unit while holding the unit at substantially the same vertical position, to insure against smear. For example, when a continual flight auger is used as the cutting unit, the auger is held in position so that it does not penetrate any deeper into the formation; then the auger may be rotated several times. This gently cuts the soil away from the wall, the auger flight acting as a trimming blade. This results in the cutting away of a core of earth, forming a hole in the soil formation, wherein none of the outer wall surface of the core is bonded with the remaining formation, so that, when the auger is removed, smearing will not occur.

A convenient method for holding the cutting unit at substantially the same vertical position during the operation is to provide a gear mechanism at the top of the auger, which mechanism may be so marked that the operator will know when he has turned the auger a complete revolution or fraction thereof.

To guard against disturbance to the subsoil, it is desirable that the auger flights advance uniformly until such time as the desired depth is reached. This may be accomplished by applying a tooth at the lower portion of the mechanism supporting the auger. As the auger rotates, the flights will screw themselves down on the tooth so that the auger will advance downward uniformly. The tooth may be designed to swivel back prior to the cutting operation so that the soil core may be trimmed and the entire auger removed without interference. In putting down a subsequent drain hole, the tooth may be swiveled back into position thereby removing any soil sticking in the auger flights as the flights screw down on the tooth. Thus, the mechanism would be self-cleaning.

I claim:

1. In settling of liquid-containing, compressible, earth formation utilizing a plurality of sand-drains, the improvement in the method of constructing the sand-drains comprising:
   (1) penetrating into the formation to the desired depth by helically cutting with a substantially continuous flight auger into the earth formation to thereby form a core of earth
   (2) removing the core from the earth formation by withdrawing the auger to thereby create a cavity and
   (3) simultaneously as the cavity is formed, filling same with a porous material.

2. The method of claim 1, wherein after penetrating into the formation to the desired depth a cylindrical cut is circumscribed throughout the depth of the penetration by making at least one complete revolution of the auger while maintaining the auger in the same vertical position as that occupied at the termination of its penetration into the earth.

3. The method of claim 1, wherein the auger is hollow shafted and wherein the cavity is filled with porous material through said hollow shaft.

4. In settling of liquid-containing, compressible earth formation utilizing a plurality of sand drains, the improvement in the method of constructing the sand drains comprising:
   (1) penetrating into the formation to the desired depth by helically cutting with a substantially continuous flight auger into the earth formation to thereby form a core of the earth.
   (2) removing the core from the earth formation by withdrawing the auger to thereby create a cavity, and
   (3) supporting the walls of the cavity by backfilling the cavity with a porous material to prevent deformation of the cavity.

References Cited in the file of this patent

UNITED STATES PATENTS

| | | |
|---|---|---|
| 2,136,151 | Parrish | Nov. 8, 1938 |
| 2,514,509 | O'Neal | July 11, 1950 |
| 2,577,252 | Kjellman | Dec. 4, 1951 |
| 2,659,208 | Jourdain | Nov. 17, 1953 |
| 2,667,749 | Steurman | Feb. 2, 1954 |
| 2,729,067 | Patterson | Jan. 3, 1956 |